LOUVRE MOUNTING

Filed Sept. 25, 1963

INVENTORS
JOHN F. NEWELL
ROBERT O. BARNES
BY [signature]
ATTORNEY 3,248,837
LOUVRE MOUNTING
John F. Newell, Verona, and Robert O. Barnes, Madison, Wis., assignors, by mesne assignments, to Wehr Corporation, Milwaukee, Wis., a corporation of Wisconsin
Filed Sept. 25, 1963, Ser. No. 311,367
10 Claims. (Cl. 52—473)

This invention relates to a mounting arrangement for louvres, vanes or like mechanisms for directing the flow of fluid mediums and has for one of its principal objects the provision of a relatively simple and yet effective, mounting connection for such louvres, vanes or the like.

For the achievement of this and other objects, this invention contemplates a mounting arrangement which permits a snap-in type connection between the louvres and their support frames and without requiring additional fastening means.

Other objects and advantages will be pointed out in, or be apparent from, the specification and claims, as will obvious modifications of the embodiment shown in the drawings, in which:

Figures 1, 3, 4:
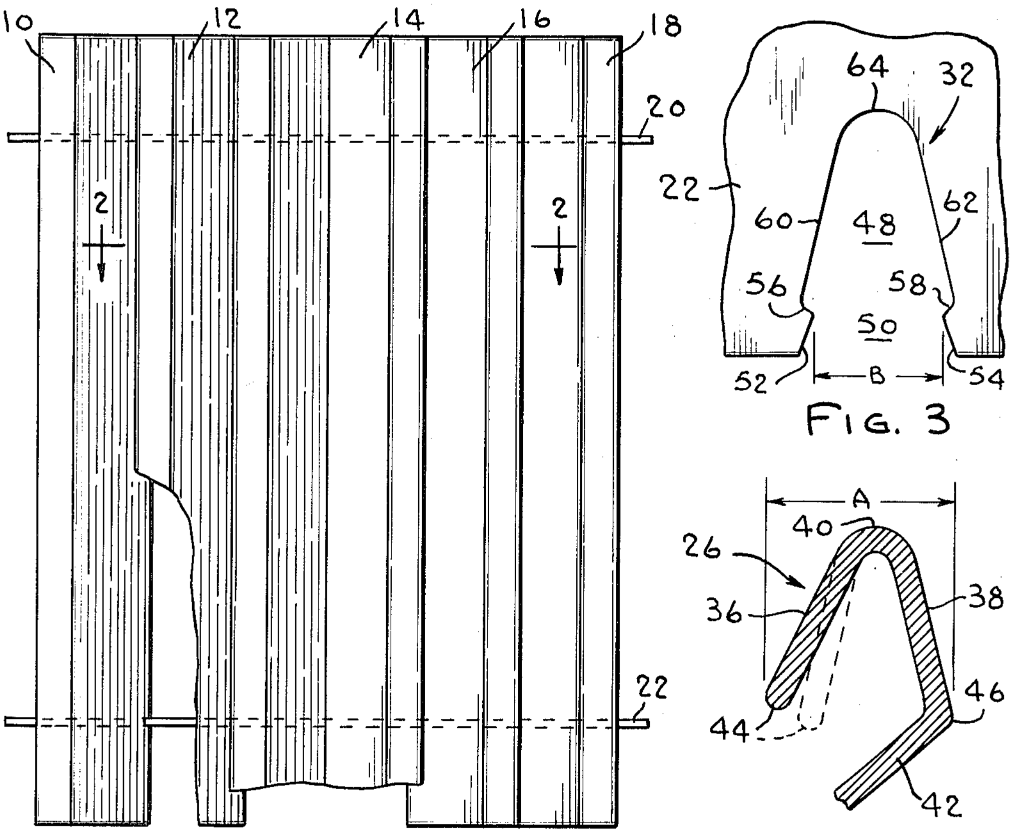
FIG. 1 is a front elevation of a number of louvres as connected to a support frame, only a portion of which is illustrated.
FIG. 3 is an enlarged view of one of the louvre mounting openings in the support frame.
FIG. 4 is an enlarged view of the mounting member of one of the louvres illustrating the member in both its relaxed and flexed positions.

This invention has application to various apparatus and installations wherein louvres, vanes or the like are used to direct the flow and/or discharge of a fluid medium and, because of this wide possible application of this invention, only a portion of the support frame is illustrated in FIG. 1. For convenience the invention will be described as embodied in an air directing system.

Louvres 10, 12, 14, 16 and 18 are supported by frame members 20 and 22 which are a part of a suitable frame. The air directing portions of the louvres form no part of this invention and can take any particular configuration necessary to produce a desired air flow pattern, that illustrated in FIGS. 1 and 2 is merely an example of one of many configurations for the louvre.

Figure 2:
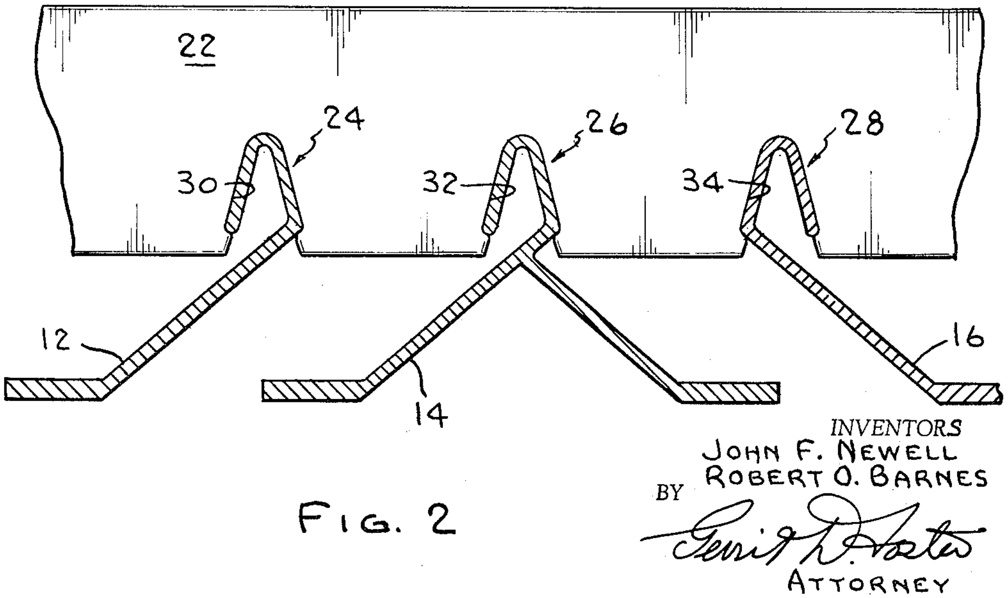
FIG. 2 is a section view taken generally along line 2—2 of FIG. 1.

Each louvre is provided with a mounting member and mounting members 24, 26 and 28 of louvres 12, 14 and 16 are illustrated in FIG. 2. It will be noted that the mounting members are identical with the mounting member 28 of louvre 16 being reversed from that of louvre 12 on the opposite side of central louvre 14. The mounting members are generally V-shaped and adapted to snap into openings 30, 32 and 34 which will be more specifically described hereinafter. Since the mounting members are identical for each louvre, only mounting member 26 will be described in detail and it will be appreciated that this description is equally applicable to the mounting members of the other louvres. Structurally, mounting member 26 comprises members 36 and 38 which converge inwardly toward a closed end 40. Side member 38 is connected to the air directing portion of this louvre by portion 42. The louvres and the mounting members therefor can be made of any suitable material, which is at least partially resilient, so that the side walls 36 and 38 can be flexed about the closed end 40. More particularly, side walls 36 and 38 will assume a relaxed position, the full line position of FIG. 4, wherein the free end 44 of side wall 36 is spaced a given distance A from the juncture point 46 of portion 42 and side wall 38. The side walls 36 and 38 can then be flexed about closed end 40 to the dotted line showing in FIG. 4 and reduce the distance between end 44 and juncture 46.

Again, since the mounting member receiving openings in the frames 20 and 22 are identical in construction, only opening 32 will be described in detail. With particular reference to FIG. 3, opening 32 includes an inner portion 48 for receipt of the mounting member and an outer portion 50 which defines a restricted entrance through which the mounting member must pass to be received in area 48. Structurally, opening 32 is defined by opposed side wall portions 52 and 54 which converge inwardly of the support member to define an entrance having a dimension B which is less than the relaxed dimension A of the mounting member. The side walls of openings 32 continue with portions 56 and 58 which diverge inwardly from the termination of portions 52 and 54 and connect with side wall portions 60 and 62 which converge inwardly to a closed end 64. Portions 56 and 58 are suitably formed to receive end 44 and juncture 46 of the mounting member and to provide seats therefor.

With this construction, the louvres can be snapped into the support frames and seated in their respective openings to be securely held in assembled relation with the supports without the necessity of additional fastening members such as screws, clips or the like. To assemble the louvres on the support members, the side walls 36 and 38 of the mounting member can be pressed inwardly to reduce the distance between free end 44 and juncture 46 sufficiently to permit passage through entrance B. With closed end 40 in engagement with closed end 64, the side walls are released for engagement with side walls 60 and 62 of the openings and to also engage end 44 and juncture 46 with the seats provided by portions 56 and 58. When the mounting member 26 is received in opening 48, its closed end 40 engages closed end 64 of the opening so that the mounting member and the louvre are securely held on the support between seats 56 and 58 and closed end 64. It is preferred that the mounting members 24, 26 and 28 extend generally coextensively with their respective louvres, however, it will be appreciated that if desired the mounting members can be of limited length and properly positioned for engagement with the support members.

The opposed converging surfaces 52 and 54 of the mounting member receiving openings could be eliminated if desired and still provide a secure snap-in mounting. However, the provision of such surfaces at the entrance to the openings permits yet another and more simplified assembly procedure for the louvres. More particularly, the louvres can be suitably held with their mounting members extending upwardly and properly spaced for alignment with the openings in the support frames. With the louvres so held, the support frame can be pressed onto the mounting members and surfaces 52 and 54 will serve as camming surfaces to collapse side walls 36 and 38 about closed end 40 and reduce the dimension A for receipt of the mounting member through entrance B. Thus, a number of louvres can be assembled onto a support frame in a single operation. Whichever mode of assembly is utilized the louvres can be readily disassembled from the support frames, if desired, by merely pinching side walls 36 and 38. It will also be noted that the mounting connection of this invention permits ready removal and replacement of one or more louvres, as desired, without disturbing the remaining louvres.

Although but one embodiment of the present invention has been illustrated and described, it will be apparent to those skilled in the art that various changes and modifications may be made therein without departing from the spirit of the invention or from the scope of the appended claims:

What we claim is:

1. The combination of at least one louvre member; a mounting member connected to and extending from said louvre member, said mounting member comprising a first portion extending from said louvre member, a second portion extending at an angle from said first portion, a third portion extending at an angle from said second portion generally in the direction of the juncture between said first and second portions and terminating at a given distance from said juncture, said mounting member being generally flexible for movement of said second and third portions toward and away from each other to vary said given distance; and a support including an opening for receiving said mounting member, the walls of said opening including relatively spaced first portions converging inwardly of said support and terminating in relative spaced relation a distance less than said given distance, second portions diverging from the termination of said first portions, and third portions converging inwardly from the termination of said second portions; said mounting member being receivable in said opening by reducing said given distance and, when received in said opening, has the termination of said third mounting member portion and said juncture in engagement with said second opening portions and also has said second and third mounting member portions in engagement with said third opening portions.

2. The combination of claim 1 wherein said louvre is generally elongated and said mounting member extends generally coextensively therewith, and said support includes relatively spaced frame members each including at least one of said openings for connection with said mounting member.

3. The combination of at least one louvre member; a mounting member connected to and extending from said louvre member, said mounting member comprising a first portion extending from said louvre member, a second portion extending at an angle from said first portion, a third portion extending at an angle from said second portion toward the juncture between said first and second portions and terminating at a given distance from said juncture, said second and third portions forming a closed end for said mounting member and said mounting member being generally flexible about said closed end to reduce said given distance; and a support including an opening conforming generally to said mounting member for receipt thereof, the walls of said opening including relatively spaced first portions converging inwardly of said support and terminating in relative spaced relation a distance less than said given distance, second portions diverging from the termination of said first portions, and third portions converging inwardly from the termination of said second portions and terminating in a closed end; said mounting member being receivable in said opening by reducing said given distance and, when received in said opening, has the free end of said third mounting member portion and said juncture in engagement with said second opening portions and the closed end of said mounting member in engagement with the closed end of said opening to securely seat said mounting member in said opening and also has said second and third mounting member portions in engagement with said third opening portions.

4. The combination of at least one louvre member; a mounting member connected to and extending from said louvre member, said mounting member comprising a first portion extending from said louvre member, a second portion extending from said first portion, and a third portion disposed at an angle to said second portion and joined thereto by a generally arcuate portion, said third portion terminating at a given distance from the juncture of said first and second portions, said mounting member being generally flexible about said arcuate portion so that said second and third portions are movable relative to each other to reduce said given distance; and a support including an opening for receiving said mounting member, said support including means defining an entrance to said opening smaller than said given distance and also defining, inwardly of said entrance, seats for the termination of the third mounting member portion and said juncture, said opening also including wall portions converging inwardly from said seats; said mounting member being receivable in said opening by reducing said given distance and, when received in said opening, has the termination of said third mounting member portion and said juncture in engagement with said seats and said second and third mounting member portions in engagement with said wall portions.

5. The combination of at least one louvre member; a mounting member connected to and extending from said louvre member, said mounting member comprising a pair of angularly related interconnected portions, means connecting said angularly related portions to said louvre member with said angularly related portions diverging outwardly toward said louvre member and terminating at a given distance from each other, said mounting member being generally flexible for relative movement between said angularly related portions to reduce said given distance; and a support including an opening for receiving said mounting member, the walls of said opening including relatively spaced first portions converging inwardly of said support and terminating in relative spaced relation a distance less than said given distance, second portions diverging from the termination of said first portions, and third portions converging inwardly from the termination of said second portions; said mounting member being receivable in said opening by reducing said given distance and, when received in said opening, has the terminations of said angularly related opening portions in engagement with said second portions and said angularly related mounting member portions in engagement with said third opening portions.

6. The combination of at least one louvre member and a support for said louvre member, one of said louvre members and supports including a mounting member and the other including means for receiving said mounting member, said mounting member comprising a first portion extending from said louvre member, a second portion connected to and extending at an angle with respect to said first portion, and a third portion connected to and extending at an angle from said second portion, said second and third portions diverging outwardly from the connection therebetween and toward said louvre member and terminating at a given distance from each other, said mounting member being generally flexible so that said second and third portions are relatively movable to vary said given distance; and said receiving means for receiving said mounting member comprising means defining an entrance smaller than said given distance and also defining, inwardly of said entrance, seats for the terminations of the second and third mounting member portions, said receiving means also including wall portions converging inwardly of said support from said seats, whereby said mounting member is receivable in said means by varying said given distance and, when so assembled, has the termination of said second and third mounting member portions in engagement with said seats and said second and third mounting member portions in engagement with said wall portions.

7. The combination of, a louvre member, a mounting portion connected to said louvre member and comprising a pair of side portions converging from a relative separation of given distance to a connecting portion having an extension between said side portions which is less than said distance so that said side portions are flexible about said connecting portion to vary said given distance; and support means including means for receiving said mounting portion, said receiving means including relatively spaced wall portions converging inwardly of said support means and also including means defining a restricted entrance to the area defined by said spaced wall portions, said restricted entrance being less than said given distance, said mounting portion being receivable in said receiving means by flexing the mounting portion for passage through said entrance.

8. The combination of a louvre and a support for said louvre, one of said louvre or support including a mounting member attached thereto and the other of said louvre or support including means for receiving said mounting member, said mounting member comprising a pair of angularly related leg portions connected at a closed end and with the free ends thereof being spaced apart a given distance in a relaxed position, said closed end having an extension between said leg portions which is less than said distance so that said angularly related leg portions are flexible about said closed end to vary said given distance, said receiving means comprising an opening conforming generally to said mounting member and means defining a restricted entrance to said opening, said restricted entrance being smaller than the relaxed distance between the ends of the legs of said mounting member, said mounting member being receivable in said receiving means by flexing said mounting member for passage through said restricted entrance.

9. In combination, at least one louvre, a mounting member extending from said louvre and comprising a generally V-shaped member flexible about its closed end and having a given relaxed distance between the opening ends thereof, means connecting said V-shaped member to said louvre with the closed end of said V-shaped member extending away from said louvre, and support means for said louvre including means for receiving said V-shaped mounting member, said receiving means comprising a generally V-shaped opening conforming generally to said mounting member and including means defining a retricted entrance to said opening and a seat disposed inwardly of each side of said entrance, said restricted entrance being small than the relaxed distance at the open end of said mounting member, said mounting member being receivable in said receiving means by flexing said mounting member for passage in said entrance and, when received therein, has the closed end thereof in engagement with the closed end of said V-shaped opening and the open end thereof in engagement with said seats.

10. The combination of claim 9 wherein said receiving means includes means defining camming surfaces disposed outwardly of said entrance for engagement with said V-shaped mounting member as it is being moved into said receiving means.

References Cited by the Examiner

UNITED STATES PATENTS

| | | | |
|---|---|---|---|
| 1,348,360 | 8/1920 | Howell | 98—121 X |
| 2,607,089 | 8/1952 | Clark et al. | |
| 2,757,765 | 8/1956 | Fitzgerald | 189—82 |
| 2,905,286 | 9/1959 | Adams et al. | 189—82 |
| 3,015,135 | 1/1962 | Dean et al. | 20—57.5 |
| 3,093,221 | 6/1963 | Purdy | 189—36 |

HARRISON R. MOSELEY, *Primary Examiner.*

REINALDO P. MACHADO, *Examiner.*